US 12,457,243 B2

United States Patent
Tiwari et al.

(10) Patent No.: US 12,457,243 B2
(45) Date of Patent: Oct. 28, 2025

(54) SYSTEMS AND METHODS FOR CORRELATING DECRYPTED TLS MESSAGES WITH NETWORK DATA IN REAL TIME

(71) Applicant: NetScout Systems, Inc., Westford, MA (US)

(72) Inventors: Tarun M. Tiwari, Plano, TX (US); John Curtin, Richardson, TX (US)

(73) Assignee: NetScout Systems, Inc., Westford, MA (US)

( * ) Notice: Subject to any disclaimer, the term of this patent is extended or adjusted under 35 U.S.C. 154(b) by 30 days.

(21) Appl. No.: 18/598,974

(22) Filed: Mar. 7, 2024

(65) Prior Publication Data

US 2025/0286910 A1    Sep. 11, 2025

Related U.S. Application Data

(60) Provisional application No. 63/561,690, filed on Mar. 5, 2024.

(51) Int. Cl.
*H04L 9/40* (2022.01)
*H04L 65/1069* (2022.01)

(52) U.S. Cl.
CPC ........ *H04L 63/166* (2013.01); *H04L 63/0428* (2013.01); *H04L 65/1069* (2013.01)

(58) Field of Classification Search
CPC .......................... H04L 63/166; H04L 63/0428
See application file for complete search history.

(56) References Cited

U.S. PATENT DOCUMENTS

| | | | |
|---|---|---|---|
| 10,630,654 B2 * | 4/2020 | Cela | H04L 69/12 |
| 11,025,728 B2 * | 6/2021 | Everhart | H04L 67/1097 |
| 11,356,418 B2 * | 6/2022 | Singh | H04L 61/2592 |
| 11,502,816 B2 * | 11/2022 | Alwen | H04L 9/0841 |
| 11,729,243 B2 * | 8/2023 | Oyman | H04L 65/80 709/219 |
| 12,143,470 B2 * | 11/2024 | Saarnivala | H04L 67/12 |
| 12,212,600 B2 * | 1/2025 | Naeimi | H04L 63/0485 |
| 12,250,296 B2 * | 3/2025 | Craciun | H04L 63/0281 |
| 2016/0315916 A1 | 10/2016 | Rothstein et al. | |

(Continued)

FOREIGN PATENT DOCUMENTS

CN    115514583 A    12/2022

*Primary Examiner* — Viral S Lakhia
(74) *Attorney, Agent, or Firm* — Foley & Lardner LLP

(57) ABSTRACT

A method includes identifying, via a kernel application executing in a kernel of a server hosting an application, a handshake operation for a communication session between a client device and the server; retrieving, via the kernel application, a session identifier for the communication session from one or more handshaking messages of the handshake operation for the communication session; storing, via the kernel application, the session identifier in a cache within the kernel; retrieving, via the kernel application, one or more data transfer messages of the communication session after the communication session has been established; correlating, via the kernel application, the one or more data transfer messages of the communication session based on the one or more data transfer messages containing the session identifier; and generating, via the kernel application, a record comprising the one or more correlated data transfer messages.

18 Claims, 6 Drawing Sheets

(56) References Cited

U.S. PATENT DOCUMENTS

| | | | |
|---|---|---|---|
| 2021/0006614 A1* | 1/2021 | Oyman | H04N 19/30 |
| 2021/0367767 A1* | 11/2021 | Saravanan | H04L 9/0844 |
| 2022/0224684 A1* | 7/2022 | Schultz | H04W 76/11 |
| 2023/0269254 A1* | 8/2023 | Robinson | H04L 63/0435 |
| | | | 726/1 |
| 2023/0421538 A1* | 12/2023 | Ponaka | H04L 63/0236 |
| 2024/0187375 A1* | 6/2024 | Nam | H04L 63/0428 |
| 2024/0275816 A1* | 8/2024 | Guo | H04L 63/166 |

* cited by examiner

SYSTEMS AND METHODS FOR CORRELATING DECRYPTED TLS MESSAGES WITH NETWORK DATA IN REAL TIME

CROSS-REFERENCE TO RELATED APPLICATIONS

This application claims the benefit of priority to U.S. Provisional Patent Application No. 63/561,690, filed Mar. 5, 2024 entitled, "SYSTEMS AND METHODS FOR CORRELATING DECRYPTED TLS MESSAGES WITH NETWORK DATA IN REAL TIME" the entirety of which is incorporated by reference herein.

BACKGROUND

Real-time network data decryption and correlation for service assurance and security is often achieved with a proxy or similar solutions. This is because the proxy-like solutions can act as a man-in-the-middle, decrypting the traffic as the traffic passes through. The decryption allows for real-time inspection and analysis of the data, which can be crucial for detecting and responding to security threats. However, while proxies can provide a wide range of use cases, they can be challenging to implement, especially in complex environments like virtualized or cloud-native infrastructures. Proxies can also introduce latency, which can be a concern in performance-sensitive environments in which the proxies can become a network bottleneck.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
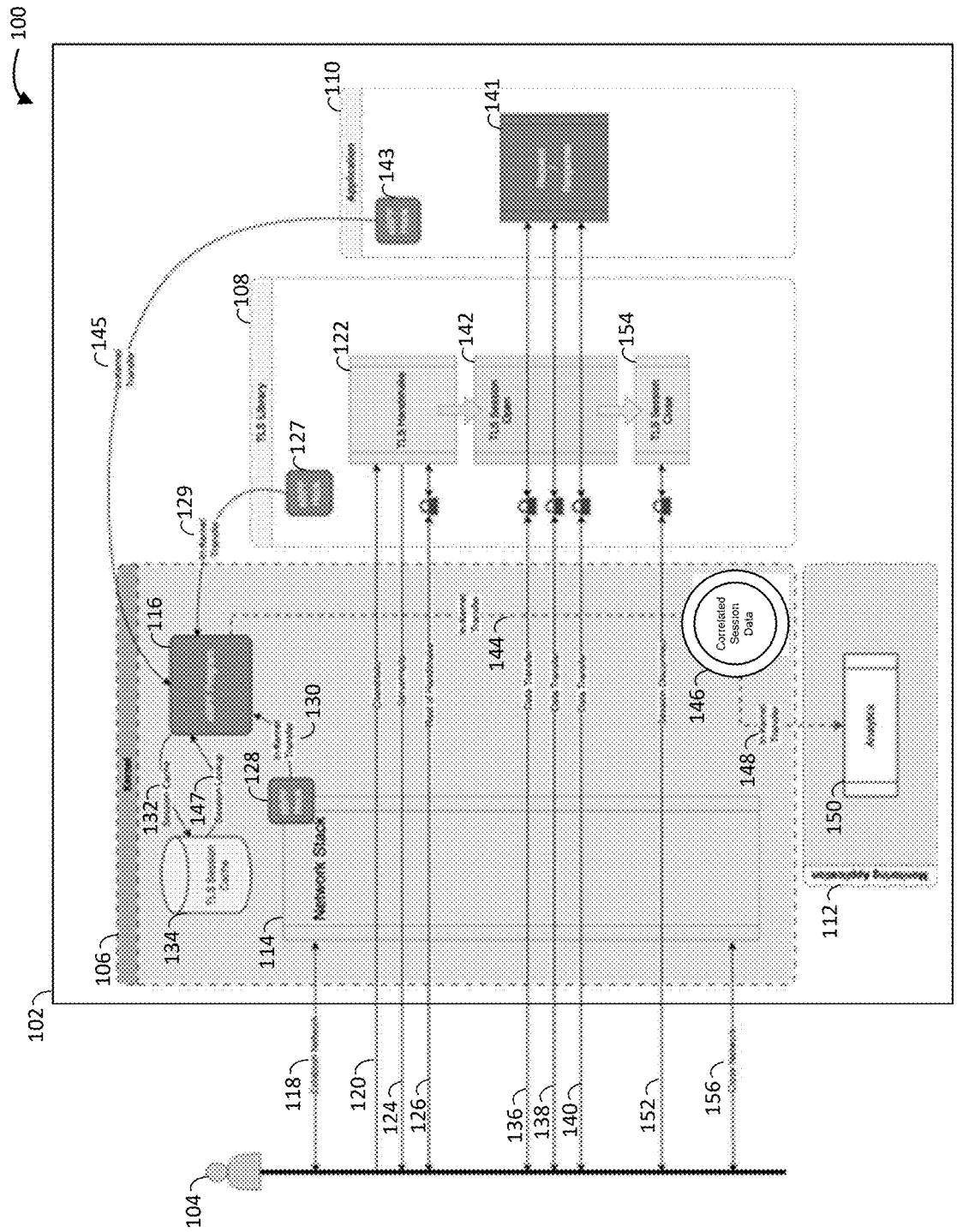
FIG. 1 is an illustration of an example system for correlating data transfer messages of a communication session in real time, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Network data packet analysis often involves using a proxy as a man-in-the middle to decrypt data packets and correlate the decrypted data packets with network data packets for network analysis. However, as previously mentioned, such solutions may have fundamental challenges in decrypted message and raw network packet capture, correlation, and storage for further analysis. The solutions do not effectively support network analytics solutions for volumetric analysis. In one example, performance challenges involving a proxy-based service mesh have been documented when the service is implemented in a Kubernetes 5G network for decrypted packet capture and shipment for remote analysis (e.g., offline analysis).

A computer implementing the systems and methods described herein may overcome the aforementioned technical challenges. For example, the computer may use a kernel application, such as the extended Berkeley Packet Filter (eBPF), for data packet detection and correlation. The kernel application can allow programs directly inside sandboxed environment in a supported kernel to operate in a safe and secure manner. Since the kernel has direct access to network packets as well as already decrypted transport layer security (TLS) data, the kernel application can capture and correlate network packets and the TLS data in the kernel's domain, such as for remote and volumetric analytics.

The kernel can facilitate a processor executing programs at multiple points during a lifecycle of a TLS session via hooks (e.g., eBPF hooks). By implementing the systems and methods described herein, a computer can use such hooks to capture the decrypted TLS records and related wire data and then correlate them within the kernel.

For example, in TLS communication, whether over reliable TCP or connectionless user datagram protocol (UDP) (e.g., datagram transport layer security (DTLS)), a client (e.g., a remote network endpoint) can send a request to a server (e.g., a local network endpoint). Via the request, the client and the server can perform a handshake to establish a secure data transmission channel (e.g., a communication channel). During the handshake process, the client can send a TLS "clienthello" message to the server and expect a "serverhello" message in return. A computer implementing the systems and methods described herein can inspect either just the clienthello messages in TLS over TCP, both the clienthello messages and the serverhello messages in DTLS, or just the serverhello messages of different communication sessions to build an in-kernel TLS session cache lookup. The computer can use the TLS session cache lookup to correlate the plain or decrypted message with corresponding network data or wired data during the actual data transfer in their respective TLS session.

For instance, a computer implementing the systems and methods described herein can use a kernel application executing in a kernel in memory of the computer to identify (e.g., based on a message detected by a hook monitoring a network stack in the kernel) a handshake operation for a communication session between a client device and the computer. Responsive to the identification of the handshake operation, the computer can use the kernel application to retrieve a session identifier and endpoint information for the communication session from one or more handshaking messages of the handshake operation for the communication session. The computer can store the session identifier and endpoint information in a cache within the kernel. Subsequent to doing so, the computer can use the kernel application to retrieve one or more data transfer messages of the communication session. The computer can receive decrypted or plaintext data packets of the data transfer messages and network packets of the communication session. The computer can correlate the decrypted or plaintext data packets with the network packets based on the network packets having endpoint information that corresponds to the same session identifier in the cache as the session identifier in the plaintext. The computer can generate a record or a companion packet that includes the correlated data. The computer can store the correlated data in memory or transmit the correlated data packet to another computing device. Because the data packets are correlated, the computer or the other computing device can perform data analytics to evaluate network performance based on the decrypted data packets.

FIG. 1 illustrates an example system 100 for correlating communication session data, in some embodiments. The system 100 may provide improved network monitoring of communication sessions. In brief overview, the system 100 can include a server 102 and a client device 104. The client device 104 can perform a handshaking operation with the server 102 to establish a communication session with the server 102. During the handshaking operation, a kernel application executing in a kernel of the server 102 can extract a session identifier from one of the messages transmitted during the handshaking operation. The server 102 can use the session identifier to correlate plaintext or decrypted data packets with corresponding network packets over the course of the connection. Doing so can enable the server or an analytics server to evaluate the connection to determine key performance indicators (KPIs) for the network and/or the communication session itself. The server 102 can be or include a set of one or more servers 402, depicted in FIG. 4A, or a data center 408.

The server 102 and/or the client device 104 can include or execute on one or more processors or computing devices (e.g., the computing device 403 depicted in FIG. 4C) and/or communicate via a network 405. The network 405 can include computer networks such as the Internet, local, wide, metro, or other area networks, intranets, satellite networks, and other communication networks such as voice or data mobile telephone networks. The network 405 can be used to access information resources such as web pages, websites, domain names, or uniform resource locators that can be presented, output, rendered, or displayed on at least one computing device (e.g., client device 104), such as a laptop, desktop, tablet, personal digital assistant, smartphone, portable computers, or speaker. In some embodiments, the network may be or include a self-organizing network that implements a machine learning model to automatically adjust connections and configurations of network elements of the network to optimize network connections (e.g., minimize latency, reduce dropped calls, increase data rate, increase quality of service, etc.).

The server 102 and/or the client device 104 can include or utilize at least one processing unit or other logic device such as programmable logic array engine, or module configured to communicate with one another or other resources or databases. The components of the server and/or the client device 104 can be separate components or a single component. The system 100 and its components can include hardware elements, such as one or more processors, logic devices, or circuits.

The client device 104 can include or execute applications to receive data from the service providers, such as the server 102. For example, the client device 104 may execute a video application upon receiving a user input selection that causes the client device 104 to open the video application on the display. Responsive to executing the video application, a service provider associated with the video application may stream a requested video to the client device 104 in a communication session. In another example, a client device 104 may execute a video game application. Responsive to executing the video game application, a service provider associated with the video game application may provide data for the video game application to the client device 104. The client devices 104 may establish communication sessions with service providers for any type of application or for any type of call. The client devices 104 can be host computing devices, in some cases.

The server 102 may comprise one or more processors that are configured to correlate plaintext data with network data of encrypted data packets using a kernel application. The server 102 may comprise a network interface, a processor, and/or memory. The processor may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in the memory to facilitate the operations described herein. The memory may be any volatile or non-volatile computer-readable storage medium capable of storing data or computer code.

The memory may include a kernel 106, a TLS library 108, an application 110, and/or a monitoring application 112, in some embodiments. In brief overview, the components 106-112 may establish a communication session with the client device 104. In doing so, the components 106-112 may store a session identifier for the communication session in a cache within the kernel 106. The components 106-112 may then transfer data to the client device 104 for the communication session. The components 106-112 may correlate plaintext or decrypted data packets with network packets of the communication session using the session identifier that is stored in the cache in the kernel 106. The components 106-112 may transmit the correlated data to another computing device for analytics.

The kernel 106 can be a kernel that is located in or otherwise loaded into memory of the server 102 upon startup. The kernel 106 can be the central component of the server 102's operating system, which is responsible for managing the system's resources and facilitating communication between hardware and software. The kernel 106 can operate at the core level of the operating system, providing critical services such as process management, memory management, device management, and system call handling. The kernel 106 can ensure efficient execution of applications by allocating system resources such as central processing unit (CPU) time and memory space.

The TLS library 108 can be a software library that provides cryptographic protocols and functions to different applications within the server 102. The TLS library 108 can be structured around the Transport Layer Security protocol and/or facilitate encrypted communication channels between networked applications. The TLS library 108 can include different cryptographic functions, such as Rivest-Shamir-Adleman (RSA), Elliptic Curve Cryptography (ECC) for key exchange, and Advanced Encryption Standard (AES) for data encryption for the secure transmission of information. The TLS library 108 can be or include a layered architecture in which each layer handles specific aspects of the TLS protocol, such as handshaking, session management, and cryptographic operations. The TLS library 108 can be or include an application programming interface (API) for initiating and managing TLS connections, encapsulating the complexity of cryptographic key generation, exchange, and the negotiation of cipher suites. The TLS library 108 can be compliant with current TLS standards, including DTLS 1.0, TLS 1.2, DTLS 1.2 and TLS 1.3, and be structured to allow for the seamless introduction of support for future protocol versions and cryptographic methods. To accommodate a range of application requirements, the TLS library 108 can include mechanisms for both synchronous and asynchronous operation, error detection, and handling routines.

The application 110 can be any application or program that is configured to provide data to different client devices. In one example, the application 110 can be configured to provide a website to a browser requesting access to the website. The application 110 can respond to requests from client devices with requested data for the website, such as by providing a web page and/or content for presentation on the web page through an established communication channel. The application 110 can respond to requests for content subsequent to the server 102 using the TLS library 108 to successfully complete a handshaking operation with a requesting computing device, in some cases. The application 110 can be configured to provide any type of data to different client devices upon request.

The kernel 106 can include a network stack 114. The network stack 114 can be or include a network protocol stack that is configured to facilitate communication over a computer network. The network stack 114 can enable the server 102 to send and receive data from different computers. For example, the network stack 114 can be configured for data handling and transmission, protocol implementation, routing and addressing, error handling and flow control, security features, interface management, and/or interoperability.

The kernel application 116 can be or include an extended Berkeley Packet Filter (eBPF) application that is configured to operate within the kernel 106 (e.g., within a Linux kernel) to perform monitoring, networking, and/or security functions without changing kernel source code or loading kernel modules. The kernel application 116 can operate by writing code (e.g., eBPF code, such as in C), which is then compiled into eBPF bytecode. The bytecode can be verified for safety by the kernel (e.g., to ensure it does not harm the system's stability or security) and then executed within the kernel context, interacting with data and events. In doing so, the kernel application 116 can run at near-native speed, which can provide high performance with minimal overhead.

The server 102 can execute the kernel application 116 to correlate decrypted data packets of a communication session between the client device 104 and the application 110 with network data packets of the same communication session. For example, the client device 104 can communicate 118 with the server 102 through the server 102's network stack 114. In doing so, the client device 104 can transmit a "clienthello" message 120 to initiate a handshaking operation to establish a communication session to access the application 110. The server 102 can use the TLS library 108 to perform a handshaking operation 122 (e.g., a TLS handshake) with the client device 104 in response to receiving the clienthello message 120. For instance, the server 102 can respond to the clienthello message 120 by transmitting a "serverhello" message 124 back to the client device 104. The server 102 and the client device 104 can then complete the rest of the handshaking operation 122 with messages 126.

In some cases, the kernel application 116 may determine to retrieve data from a data packet in the kernel 106 based on a notification from a hook 127 on or in the TLS library 108. The hook 127 can detect a message that was transmitted using the TLS library 108 and transmit a message or signal 129 to the kernel application 116 responsive to detecting the message. The kernel application 116 can retrieve any of the messages 120, 124, and/or 126 responsive to receiving the notification or indication from the hook 127.

The kernel application 116 can detect a session identifier for the communication session between the server 102 and the client device 104 based on one or more of the messages transmitted in the handshaking operation 122. For instance, the kernel 106 can include a hook 128 (e.g., an eBPF hook or an event-based hook) that is configured to detect when the server 102 receives a message through the network stack 114. The hook 128 can detect one or more of the messages 120, 124, and/or 126 and transmit a signal 130 to the kernel application 116 indicating the detected messages 120, 124, and/or 126 responsive to the detection. The messages 120, 124, and/or 126 can be handshaking messages because they are used to perform a handshake to establish a communication session between the client device 104 and the server 102. The kernel application 116 can then retrieve at least one of the messages 120, 124, and/or 126 from a location in memory of the kernel 106 and identify a session identifier and an endpoint for the data packet for the communication session between the server 102 and the client device 104 from the retrieved message or messages 120, 124, and/or 126. In some embodiments, the session identifier may only be in the messages 124, and 126 after the message 120 have been transmitted. The kernel application 116 can store 132 the session identifier in a cache 134 (e.g., a TLS session cache) to later use to correlate data packets for the communication session.

The kernel application 116 can additionally or instead retrieve one or more data points of a five-tuple from the data packets of the messages 120, 124, and/or 126. For example, the data packets may include a five-tuple of computer network information including a source IP address, a destination IP address, a source port, a destination port, and/or a transport protocol. The kernel application 116 can retrieve any combination of the data of the five-tuple of the data packets with the session identifier in the data packets. The source and destination IP addresses and ports may be endpoints of the communication session indicating the devices that are communicating in the communication session. The kernel application 116 may store the retrieved data from the five-tuple from the data packets and store the retrieved data in the cache 134 with the session identifier of the communication session.

The cache 134 can be a location in memory or a database stored in the kernel 106. The cache 134 can be configured as a key-value store (hash table or a lookup table) that stores session identifiers as keys and corresponding network endpoints as values for different communication sessions. The kernel application 116 can detect handshaking operations of different communications over time and retrieve session identifiers for the handshaking operations from the data packets that are transmitted for the handshaking operations.

The kernel application 116 can store the session identifiers and corresponding endpoints in the cache 134 as the kernel application 116 retrieves the session identifiers and endpoints.

Subsequent to successfully completing the handshaking operation 122, the communication session can be in a TLS open state 142. In the TLS open state 142, the client device 104 can exchange data transfer messages with the application 110. For example, the client device 104 can transmit a data transfer message 136 to the application 110 requesting data (e.g., a web page, video, image, text, or any other type of content) from the application 110. The application 110 can receive the data transfer message 136 and transmit a response message 138 with the requested data. The client device 104 and the application 110 can exchange messages 140 in this manner over time. In exchanging the messages 136, 138, and/or 140 as requests and responses 141, the client device 104 and the application 110 can transmit the messages over the communication session that the client device 104 established with the server 102 through the handshaking operation 122.

In some cases, the kernel application 116 may determine to retrieve data from a data packet in the kernel 106 based on a notification from a hook 143 on or in the application 110. The hook 143 can detect a message that was transmitted or received by the application 110 and transmit a message or signal 145 to the kernel application 116 responsive to detecting the message. The kernel application 116 can retrieve (e.g., from memory of the kernel 106) any of the messages 136, 138, and/or 140 responsive to receiving the notification or indication from the hook 143.

The kernel application 116 can identify the session identifier of the communication session between the client device 104 and the application 110 from the messages 136, 138, and/or 140. For example, one or more data packets of the messages 136, 138, and/or 140 may pass through the kernel 106 in a decrypted, unencrypted, or otherwise plaintext state. The session identifier for the communication session can be included as text in the decrypted, unencrypted, or plaintext state. The kernel application 116 can identify the session identifier from the data packets because the session identifier is not encrypted in the kernel 106 when accessed by the kernel application 116. Accordingly, the kernel application 116's positioning within the kernel 106 may facilitate or enable the kernel application 116 to access the session identifier of an encrypted data packet from the unencrypted plaintext of the data packet.

The kernel application 116 can use the session identifier from the data packet in a lookup 147 of the cache 134. For example, the kernel application 116 can use the session identifier as a key to query the cache 134 for a matching session identifier. The kernel application 116 can identify a matching session identifier in the cache 134 and retrieve endpoint data for the communication session from the cache 134 that corresponds to the matching session identifier in the cache 134. Such endpoint information may not be available to the kernel application 116 in the plaintext. Thus, by using the session identifier as a key in the kernel, the kernel application 116 can identify endpoint information of data packets that would otherwise be unavailable.

The kernel application 116 can correlate the plaintext of the messages 136, 138, and/or 140 with network packets or wired data of the messages 136, 138, and/or 140. The kernel application 116 can do so based on the endpoint information that the kernel application 116 retrieved from the cache 134 based on the session identifier in the plaintext of the messages 136, 138, and/or 140. For example, the kernel application 116 can identify the endpoint information of the network packets of the messages 136, 138, and/or 140. The kernel application 116 can compare the endpoint information retrieved from the cache based on a session identifier in the plaintext and determine the network packet and plaintext correspond to the same data packet, message, and/or communication session based on the endpoint information retrieved from the cache 134 matching the endpoint information in the network packets.

In cases in which multiple packets with matching endpoint information are detected, the kernel application 116 can assign the plaintext to the network packets based on timestamps of the plaintext and/or network packets, in some embodiments. For example, the plaintext and/or the network packets of data packets may each correspond to (e.g., include) a timestamp indicating when the data packet was generated, transmitted, and/or received (e.g., by the server 102 or the client device 104). The kernel application 116 can order the network packets with matching endpoint information to the plaintext based on the timestamps (e.g., based on the timestamps matching and/or being in sequence with each other). In some cases, the data packets may include sequence numbers that the kernel application 116 may use to match the plaintext to the network packets. The kernel application 116 can store 144 the mapped or matched plaintext and network packets as session data in a memory buffer 146 (e.g., a ring buffer) of the kernel 106.

The kernel application 116 can generate a record containing the matched or mapped plaintext and network packets. For example, the kernel application 116 can generate a record (e.g., a synthetic data packet, a companion data packet, a file, a document, a table, a listing, a message, a notification, etc.) that contains the plaintext of an encrypted data packet tagged with the network packet information (e.g., by retrieving the tagged plaintext from the memory buffer 146). In some cases, the record can be a data packet configured to be transmitted across the network (e.g., the record can contain the plaintext, the endpoint information, and/or the session identifier in the payload and include an identifier of a remote computing device for transmission to the remote computing device). In some embodiments, the kernel application 116 can include other wired data in the record, such as timestamps of points in the journey of the data packet, sequence and acknowledgment numbers, and/or time-to-live values. The kernel application 116 can generate such records for any number of data packets that the kernel application 116 correlates as described herein. The kernel application 116 can transmit or send 148 the records to the monitoring application 112.

The monitoring application 112 can include executable instructions that, when executed by the server 102, cause the server 102 to analyze the records or data packets. For example, the monitoring application 112 can execute an analytics protocol 150 that causes the monitoring application 112 to use one or more rules or functions to analyze the records of correlated session data. In some cases, the monitoring application 112 can do so to generate one or more key performance indicators (KPIs) and/or alerts regarding the network or the communication session.

For instance, the monitoring application 112 can analyze the network packet data of one or more records for one or more communication sessions to determine different KPIs and/or alerts. Examples of KPIs include, but are not limited to, latency, number of connections, quality of the connections, volume of data transmitted, average connection time, cell PRB (physical resources blocks), resources consumed, etc. Other examples of KPIs may be related to connection quality such as min/max/average/mean and distribution of connection mean opinion score (MOS), connection drops, retransmissions, etc. An example of an alert may be an alert of a security breach. The monitoring application 112 may generate the KPIs or alerts for individual communication sessions, geographical areas in which individual nodes that are communicating and receiving data across the network are located, types of devices, etc.

In some embodiments, instead of performing the analytics, the monitoring application 112 can transmit the records of the correlated data to remote computing devices, such as an analytics server. The analytics server can receive the records and generate KPIs and/or alerts using one or more rules or algorithms in a similar manner to the monitoring application.

In some embodiments, the monitoring application 112 and/or the analytics server can adjust the network based on the KPIs, alerts, and/or the analysis of the records containing the correlated data. For example, the monitoring application 112 can determine that a communication session is a part of a denial-of-service attack based on the analysis. Responsive to doing so, the monitoring application 112 can transmit an indication of the attack and/or the endpoint information of the computing devices to a network provider of the network through which the communication session is being performed. The network provider may receive the data and adjust the network accordingly, such as by blocking one of the endpoints from transmitting further messages over the network or otherwise throttling the endpoints to reduce the packet count one of the endpoints is transmitting and/or receiving across the network. The network provider can be a self-organizing network and automatically adjust the network based on the message or otherwise operated by an operator and adjust based on input by the operator according to the indication from the monitoring application or the analytics server.

The kernel application 116 can repeat the correlation process over the course of the communication session until the communication session ends. For example, the communication session may end when one of the computing device 104 or the server 102 sends or transmits a disconnect message 152. Responsive to transmitting and/or receiving the disconnect message 152, the server 102 can use the TLS library 108 to close the communication session. Responsive to closing the communication session, the client device 104 can drop 156 the connection with the network stack 114 in the kernel 106.

Figure 2:
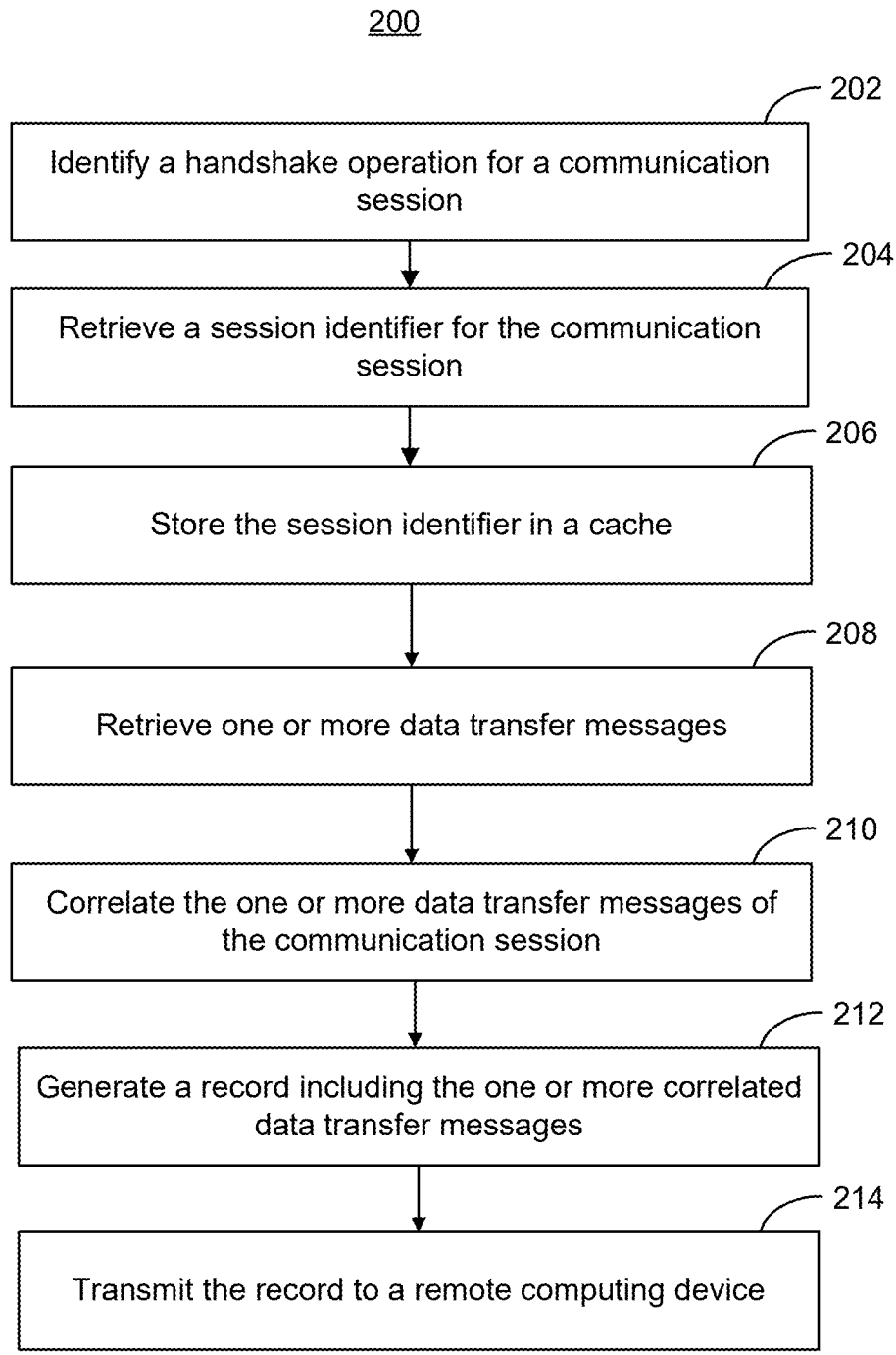
FIG. 2 is a flow chart of an example method for correlating data transfer messages of a communication session in real time, in accordance with an implementation.

FIG. 2 is an illustration of a method 200 for correlating communication session data, in accordance with an implementation. The method 200 can be performed by a data processing system (a client device, a probe, the server 102, shown and described with reference to FIG. 1, a server system, etc.). The method 200 may include more or fewer operations and the operations may be performed in any order. Performance of the method 200 may enable the data processing system to correlate plaintext and network packet data of encrypted data packets without decrypting and re-encrypting the encrypted data packets. The data processing system can do so by executing an application in a kernel in memory of the data processing system to identify a communication identifier and endpoint information of a communication session during a handshaking operation and then later using the communication session identifier as a key in a look-up table for data packets transmitted during the established communication session to retrieve the endpoint information. The data processing system can use the endpoint information to identify the network packet information that corresponds to plaintext of the data packets. The data processing system can correlate the plaintext with the network packet data in a record. The data processing system or an external computer can process the correlated data to generate KPIs or alerts for the communication session and/or the network maintaining the communication session.

At operation 202, a data processing system identifies a handshake operation. The data processing system can identify the handshake operation for a communication session using a kernel application executing in a kernel of the data processing system. For example, the data processing system may have a hook that monitors the network stack within the kernel. The hook may detect receipt of a handshaking message configured for initiating the establishment of a communication session between the data processing system and a client device. The hook may transmit a signal to the kernel application responsive to detecting the message establishing the communication session.

At operation 204, the data processing system retrieves a session identifier for the communication session. The data processing system can retrieve the session identifier for the communication session responsive to identifying the handshake operation for the communication session. The data processing system can retrieve the session identifier from one of the messages that are transmitted between the data processing system and the client device during the handshake operation. The data processing system can additionally retrieve endpoint information for the messages, such as the source and/or destination IP addresses and/or ports for the messages. The data processing system can retrieve the session identifier and/or the endpoint information using the kernel application. At operation 206, the data processing system can (e.g., via the kernel application) store the retrieved session identifier and/or endpoint information in a cache in the kernel.

At operation 208, the data processing system retrieves one or more data transfer messages. The data transfer messages can include requests and/or response messages between the client device and the data processing system (e.g., an application executed by the data processing system). The data processing system can retrieve the one or more data transfer messages using the kernel application. In doing so, the kernel application can retrieve the plaintext of the data transfer messages. Because the kernel application is operating in the kernel, the kernel application may retrieve the plaintext of the data transfer messages even in cases in which the data transfer messages are encrypted.

At operation 210, the data processing system correlates the one or more data transfer messages. The data processing system can correlate the one or more data transfer messages of the communication session (e.g., correlate the plaintext of the one or more data transfer messages with the network packets of the data transfer messages). The data processing system can correlate the one or more data transfer messages based on a session identifier in the plaintext of the one or more data transfer messages. For example, the data processing system can identify a session identifier in the plaintext of the one or more transfer messages. The data processing system can compare the session identifier with the session identifiers in the cache to identify endpoint information that corresponds with the same session identifier. The data processing system can retrieve the endpoint information from the cache. The data processing system can tag the plaintext with the session identifier and/or the retrieved endpoint information to generate corresponding data transfer messages.

At operation 212, the data processing system generates a record. The data processing system can generate the record to include the one or more correlated data transfer messages. In some cases, the data processing system generates the record by performing the operation 214. In some cases, the data processing system includes network data from the network packet corresponding to the plaintext in the record that can be used for analytics.

At operation 214, the data processing system transmits the record. The data processing system can transmit the record to a remote computing device, such as an analytics server that is configured to evaluate such records individually or in combination to generate analytics (e.g., KPIs and/or alerts) of the communication by itself and/or across communication session sessions to generate analytics for the network. In some cases, the analytics server may cause a network service provider to reorganize the network based on the analytics, such as responsive to the analytics indicating a computing device is performing an attack on the network.

Figure 3:
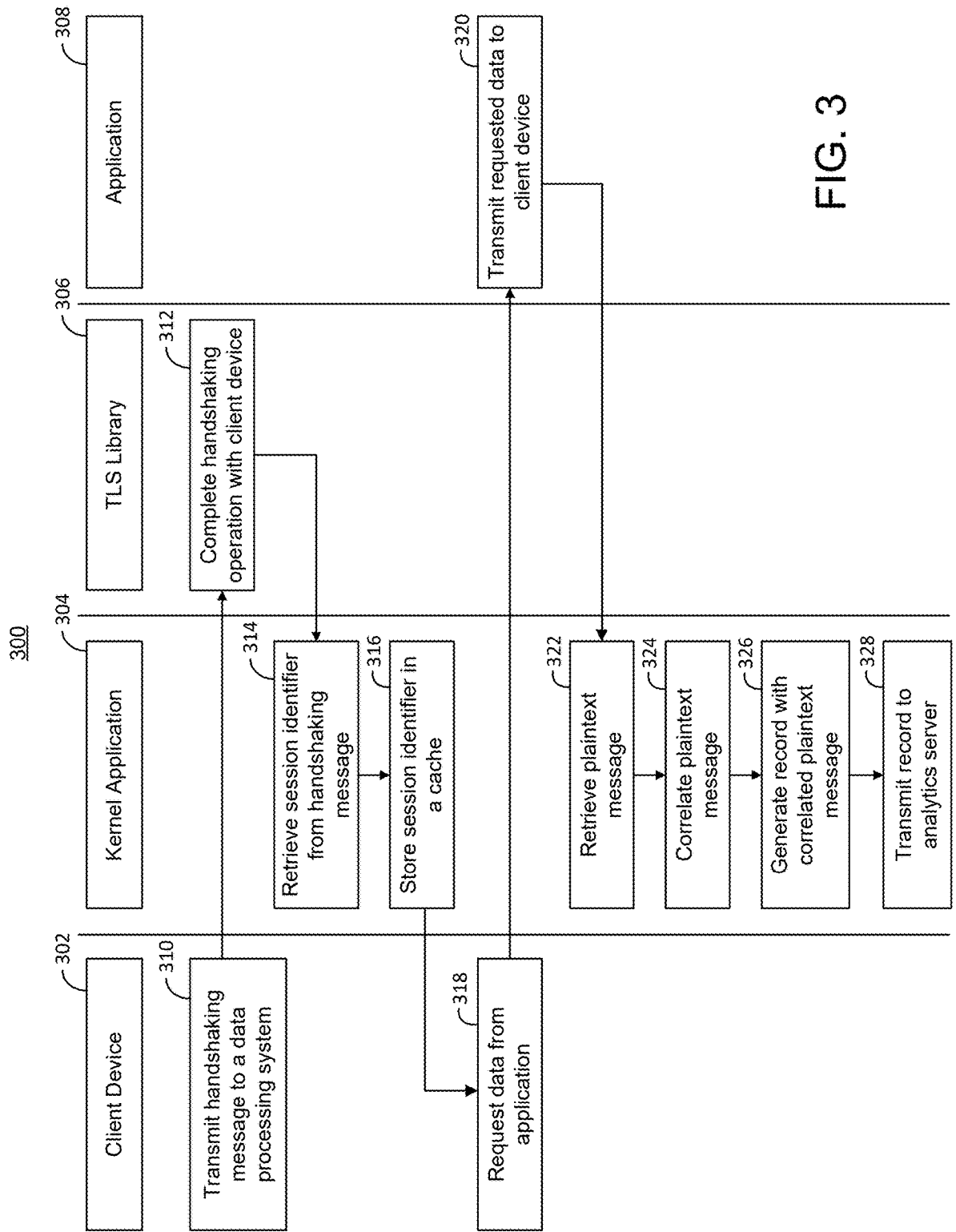
FIG. 3 is a swimlane diagram of an example method for correlating data transfer messages of a communication session in real time, in accordance with an implementation.

FIG. 3 is a swimlane diagram of an example method 300 for correlating data transfer messages with a communication session in real time, in accordance with an implementation. The method 300 can be performed by one or more computers of a system, such as a client device 302 and a data processing system (a client device, a probe, the server 102, shown and described with reference to FIG. 1, a server system, etc.). In performing the method 300, the data processing system may execute and/or use a kernel application 304, a TLS library 306, and/or and an application 308. The kernel application 304, the TLS library 306, and the application 308 can be the same as or similar to the corresponding components of the server 102 described with reference to FIG. 1. The method 300 may include more or fewer operations and the operations may be performed in any order. The method 300 can be performed by any number of computing devices and/or applications. One or more operations of the method 300 may be performed in performing one or more operations of the method 200. Performance of the method 300 may enable the data processing system to correlate plaintext and network packet data of encrypted data packets without decrypting and re-encrypting the encrypted data packets.

At operation 310, the client device 302 transmits a handshaking message to a data processing system to establish a communication session with the data processing system in a handshaking operation. The client device 302 may transmit such a handshaking message to access a website hosted by the data processing system or otherwise content provided by the application 308 hosted by the data processing system. At operation 312, the data processing system uses the TLS library 306 to complete the handshaking operation. At operation 314, the kernel application 304 of the data processing system retrieves a session identifier for the communication session. The kernel application 304 can retrieve the session identifier for the communication session from a handshake message transmitted by one of the client device 302 or the data processing system. The kernel application 304 can additionally retrieve endpoint information from the handshake message. The kernel application 304 can store the session identifier and/or the endpoint information in a cache in the kernel of the data processing system.

At operation 318, the client device 302 requests data from the application 308. The client device 302 can request the data by transmitting a data transfer message (e.g., an encrypted message) to the application 308 through the established communication session and over a network. At operation 320, the application 308 can retrieve and/or generate the requested data and transmit the requested data back to the client device 302 in a data transfer message. The client device 302 can repeat this process any number of times over the course of the communication session. Such communications may be encrypted to avoid eavesdroppers or other malicious parties.

While transmitting and receiving the data transfer messages, the kernel application 304 can operate in the kernel to retrieve, at operation 322, the plaintext messages of the data transfer messages. Because the kernel application 304 operates in the kernel, the kernel application 304 can access the decrypted or non-encrypted plaintext payload of the data transfer messages. The kernel application 304 can retrieve the plaintext messages by identifying the plaintext messages from memory in the kernel.

At operation 324, the kernel application 304 correlates the plaintext message. The kernel application 304 can correlate the plaintext message with one or more network packets that contain endpoint information and/or metadata regarding the message and/or the communication session. The kernel application 304 can correlate the plaintext message by first identifying a session identifier in the plaintext message. The kernel application 304 can use the session identifier as a look-up in the cache in the kernel to identify endpoint information that corresponds to the same session identifier in the cache. The kernel application 304 can retrieve the endpoint information from the cache and tag the plaintext with the plaintext message with the endpoint information and/or the session identifier. The kernel application 304 can use the endpoint information to identify one or more network packets with the same endpoint information. At operation 326, the kernel application 304 generates a record and stores the network packets or the data of the network packets in the record with the plaintext and/or the tagged endpoint information and/or session identifier. At operation 328, the data processing system transmits the record to an analytics server for further processing.

At least one aspect of a technical solution to the aforementioned problem is directed to a method. The method may include identifying, by one or more processors via a kernel application executing in a kernel of a server hosting an application, a handshake operation for a communication session between a client device and the server; retrieving, by the one or more processors via the kernel application, a session identifier for the communication session from one or more handshaking messages of the handshake operation for the communication session; storing, by the one or more processors via the kernel application, the session identifier in a cache within the kernel; retrieving, by the one or more processors via the kernel application, one or more data transfer messages of the communication session after the communication session has been established; correlating, by the one or more processors via the kernel application, the one or more data transfer messages of the communication session based on the one or more data transfer messages containing the session identifier; and generating, by the one or more processors via the kernel application, a record comprising the one or more correlated data transfer messages. The one or more correlated data transfer messages can be used to perform network analytics on a network through which the communication session is performed.

At least one aspect of a technical solution to the aforementioned problem is directed to a system. The system may include one or more processors coupled with memory in a server and configured to, via a kernel application executing within a kernel in the memory identify a handshake operation for a communication session between a client device and the server; retrieve a session identifier for the communication session from one or more handshaking messages of the handshake operation for the communication session; store the session identifier in a cache within the kernel; retrieve one or more data transfer messages of the communication session after the communication session has been established; correlate the one or more data transfer messages of the communication session based on the one or more data transfer messages containing the session identifier; and generate a record comprising the one or more correlated data transfer messages. The one or more correlated data messages can be used to perform network analytics on a network through which the communication session is performed.

At least one aspect of a technical solution to the aforementioned problem is directed to non-transitory computer readable storage media. The non-transitory computer-readable media can be configured to be stored in executed in a kernel of a memory coupled to one or more processors of a server and comprising instructions that, when executed by the one or more processors, cause the one or more processors to identify a handshake operation for a communication session between a client device and the server; retrieve a session identifier for the communication session from one or more handshaking messages of the handshake operation for the communication session; store the session identifier in a cache within the kernel; retrieve one or more data transfer messages of the communication session after the communication session has been established; correlate the one or more data transfer messages of the communication session based on the one or more data transfer messages containing the session identifier; and generate a record comprising the one or more correlated data transfer messages. The one or more correlated data messages can be used to perform network analytics on a network through which the communication session is performed.

Figure 4A:
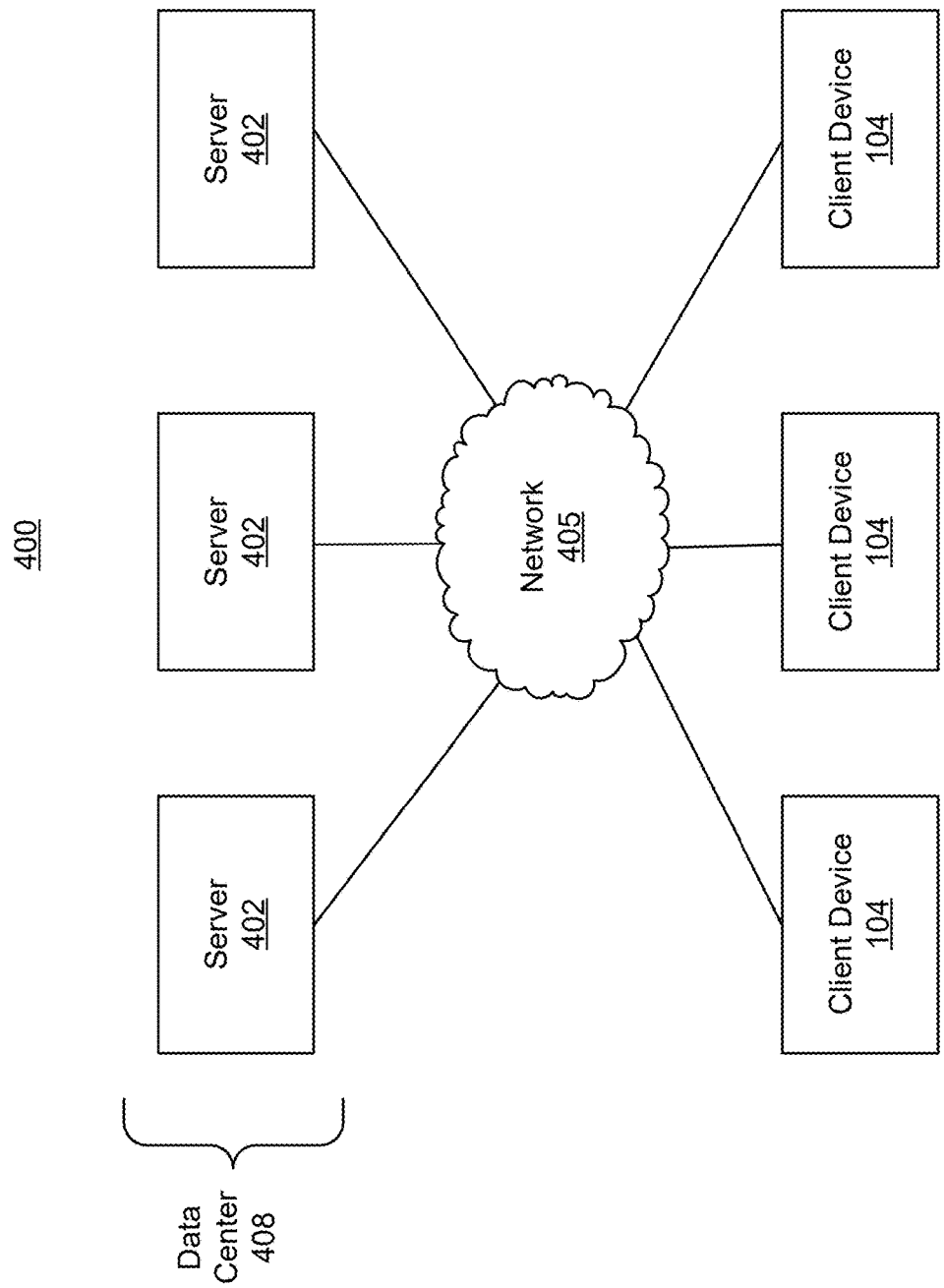
FIG. 4A is a block diagram depicting an implementation of a network environment including a client device in communication with a server device.

FIG. 4A depicts an example network environment that can be used in connection with the methods and systems described herein. In brief overview, the network environment 1400 includes one or more client devices 104 (also generally referred to as clients, client node, client machines, client computers, client computing devices, endpoints, or endpoint nodes) in communication with one or more servers 402 (also generally referred to as servers, nodes, or remote machine) via one or more networks 405. In some embodiments, a client 104 has the capacity to function as both a client node seeking access to resources provided by a server and as a server providing access to hosted resources for other client devices 104.

Although FIG. 4A shows a network 405 between the client devices 104 and the servers 402, the client devices 104 and the servers 402 can be on the same network 405. In embodiments, there are multiple networks 405 between the client devices 104 and the servers 402. The network 405 can include multiple networks such as a private network and a public network. The network 405 can include multiple private networks.

The network 405 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA. In some embodiments, different types of data can be transmitted via different links and standards. In other embodiments, the same types of data can be transmitted via different links and standards.

The network 405 can be any type and/or form of network. The geographical scope of the network 405 can vary widely and the network 405 can be a body area network (BAN), a personal area network (PAN), a local-area network (LAN), e.g., Intranet, a metropolitan area network (MAN), a wide area network (WAN), or the Internet. The topology of the network 405 can be of any form and can include, e.g., any of the following: point-to-point, bus, star, ring, mesh, or tree. The network 405 can be an overlay network which is virtual and sits on top of one or more layers of other networks 405. The network 405 can be of any such network topology as known to those ordinarily skilled in the art capable of supporting the operations described herein. The network 405 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 405 can be a type of a broadcast network, a telecommunications network, a data communication network, or a computer network.

The network environment 400 can include multiple, logically grouped servers 402. The logical group of servers can be referred to as a data center 408 (or server farm or machine farm). In embodiments, the servers 402 can be geographically dispersed. The data center 408 can be administered as a single entity or different entities. The data center 408 can include multiple data centers 408 that can be geographically dispersed. The servers 402 within each data center 408 can be homogeneous or heterogeneous (e.g., one or more of the servers 402 or machines 402 can operate according to one type of operating system platform (e.g., WINDOWS NT, manufactured by Microsoft Corp. of Redmond, Washington), while one or more of the other servers 402 can operate on according to another type of operating system platform (e.g., Unix, Linux, or Mac OS X)). The servers 402 of each data center 408 do not need to be physically proximate to another server 402 in the same machine farm 408. Thus, the group of servers 402 logically grouped as a data center 408 can be interconnected using a network. Management of the data center 408 can be de-centralized. For example, one or more servers 402 can comprise components, subsystems and modules to support one or more management services for the data center 408.

Server 402 can be a file server, application server, web server, proxy server, appliance, network appliance, gateway, gateway server, virtualization server, deployment server, SSL VPN server, or firewall. In embodiments, the server 402 can be referred to as a remote machine or a node. Multiple nodes can be in the path between any two communicating servers.

Figure 4B:
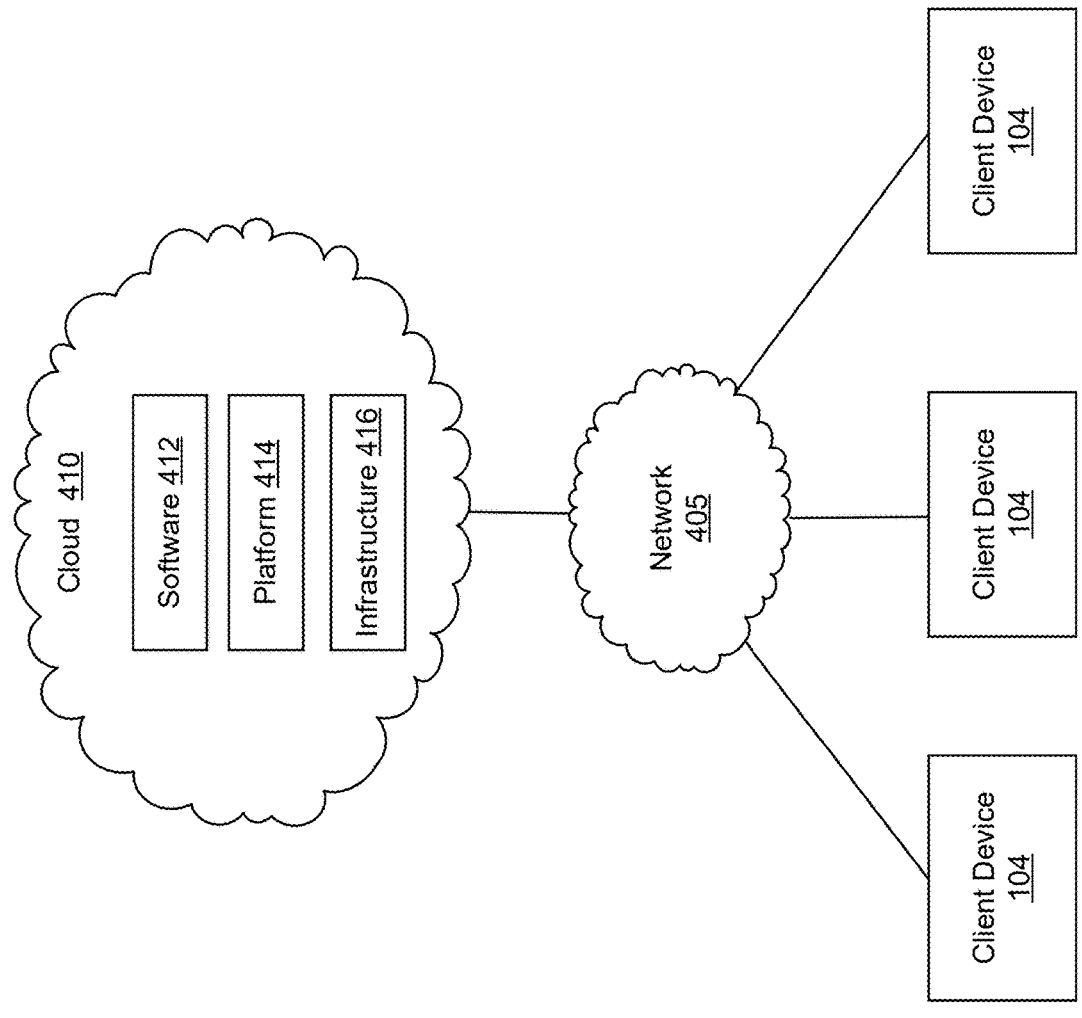
FIG. 4B is a block diagram depicting a cloud computing environment including a client device in communication with cloud service providers.

FIG. 4B illustrates an example cloud computing environment. A cloud computing environment 401 can provide client 104 with one or more resources provided by a network environment. The cloud computing environment 401 can include one or more client devices 104, in communication with the cloud 410 over one or more networks 405. Client devices 104 can include, e.g., thick clients, thin clients, and zero clients. A thick client can provide at least some functionality even when disconnected from the cloud 410 or servers 402. A thin client or a zero client can depend on the connection to the cloud 410 or server 402 to provide functionality. A zero client can depend on the cloud 410 or other networks 405 or servers 402 to retrieve operating system data for the client device. The cloud 410 can include back end platforms, e.g., servers 402, storage, server farms or data centers.

The cloud 410 can be public, private, or hybrid. Public clouds can include public servers 402 that are maintained by third parties to the client devices 104 or the owners of the clients. The servers 402 can be located off-site in remote geographical locations as disclosed above or otherwise. Public clouds can be connected to the servers 402 over a public network. Private clouds can include private servers 402 that are physically maintained by client devices 104 or owners of clients. Private clouds can be connected to the servers 402 over a private network 405. Hybrid clouds 408 can include both the private and public networks 405 and servers 402.

The cloud 410 can also include a cloud-based delivery, e.g., Software as a Service (Saas) 412, Platform as a Service (PaaS) 414, and the Infrastructure as a Service (IaaS) 416. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 104 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 104 and server 402 can be deployed as and/or executed on any type and form of computing device, e.g., a computer, network device or appliance capable of communicating on any type and form of network and performing the operations described herein.

Figure 4C:
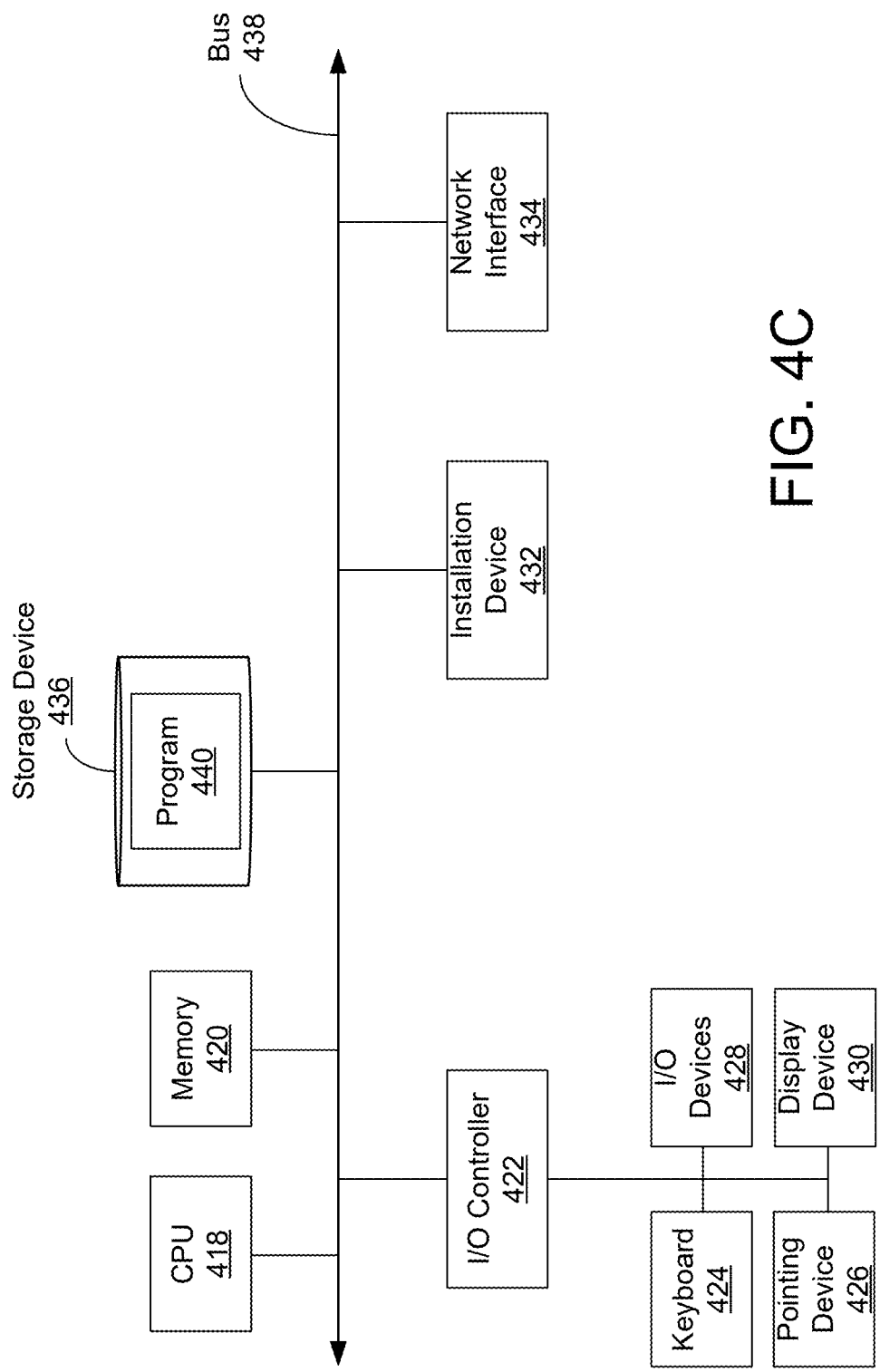
FIG. 4C is a block diagram depicting an implementation of a computing device that can be used in connection with the systems depicted in FIGS. 1, 4A, and 4B and the methods depicted in FIGS. 2 and 3.

FIG. 4C depicts block diagrams of a computing device 403 useful for practicing an embodiment of the client 104 or a server 402. As shown in FIG. 4C, each computing device 403 can include a central processing unit 418, and a main memory unit 420. As shown in FIG. 4C, a computing device 403 can include one or more of a storage device 436, an installation device 432, a network interface 434, an I/O controller 422, a display device 430, a keyboard 424 or a pointing device 426, e.g., a mouse. The storage device 436 can include, without limitation, a program 440, such as an operating system, software, or software associated with system 100.

The central processing unit 418 is any logic circuitry that responds to and processes instructions fetched from the main memory unit 420. The central processing unit 418 can be provided by a microprocessor unit, e.g.: those manufactured by Intel Corporation of Mountain View, California. The computing device 403 can be based on any of these processors, or any other processor capable of operating as described herein. The central processing unit 418 can utilize instruction level parallelism, thread level parallelism, different levels of cache, and multi-core processors. A multi-core processor can include two or more processing units on a single computing component.

Main memory unit 420 can include one or more memory chips capable of storing data and allowing any storage location to be directly accessed by the microprocessor 418. Main memory unit 420 can be volatile and faster than storage 436 memory. Main memory units 420 can be Dynamic random access memory (DRAM) or any variants, including static random access memory (SRAM). The memory 420 or the storage 436 can be non-volatile; e.g., non-volatile read access memory (NVRAM). The memory 420 can be based on any type of memory chip, or any other available memory chips. In the example depicted in FIG. 4C, the processor 418 can communicate with memory 420 via a system bus 438.

A wide variety of I/O devices 428 can be present in the computing device 403. Input devices 428 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 428 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 428, display devices 430 or group of devices can be augmented reality devices. The I/O devices can be controlled by an I/O controller 422 as shown in FIG. 4C. The I/O controller 422 can control one or more I/O devices, such as, e.g., a keyboard 424 and a pointing device 426, e.g., a mouse or optical pen. Furthermore, an I/O device can also provide storage and/or an installation device 432 for the computing device 403. In embodiments, the computing device 403 can provide USB connections (not shown) to receive handheld USB storage devices. In embodiments, an I/O device 428 can be a bridge between the system bus 438 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 430 can be connected to I/O controller 422. Display devices can include, e.g., liquid crystal displays (LCD), electronic papers (e-ink) displays, flexile displays, light emitting diode displays (LED), or other types of displays. In some embodiments, display devices 430 or the corresponding I/O controllers 422 can be controlled through or have hardware support for OPENGL or DIRECTX API or other graphics libraries. Any of the I/O devices 428 and/or the I/O controller 422 can include any type and/or form of suitable hardware, software, or combination of hardware and software to support, enable or provide for the connection and use of one or more display devices 430 by the computing device 403. For example, the computing device 403 can include any type and/or form of video adapter, video card, driver, and/or library to interface, communicate, connect or otherwise use the display devices 430. In embodiments, a video adapter can include multiple connectors to interface to multiple display devices 430.

The computing device 403 can include a storage device 436 (e.g., one or more hard disk drives or redundant arrays of independent disks) for storing an operating system or other related software, and for storing application software programs 440 such as any program related to the systems, methods, components, modules, elements, or functions depicted in FIG. 1, 2, or 3. Examples of storage device 436 include, e.g., hard disk drive (HDD); optical drive including CD drive, DVD drive, or BLU-RAY drive; solid-state drive (SSD); USB flash drive; or any other device suitable for storing data. Storage devices 436 can include multiple volatile and non-volatile memories, including, e.g., solid state hybrid drives that combine hard disks with solid state cache. Storage devices 436 can be non-volatile, mutable, or read-only. Storage devices 436 can be internal and connect to the computing device 403 via a bus 438. Storage device 436 can be external and connect to the computing device 403 via an I/O device 430 that provides an external bus. Storage device 436 can connect to the computing device 403 via the network interface 434 over a network 405. Some client devices 104 may not require a non-volatile storage device 436 and can be thin clients or zero client devices 104. Some storage devices 436 can be used as an installation device 432 and can be suitable for installing software and programs.

The computing device 403 can include a network interface 434 to interface to the network 405 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 403 can communicate with other computing devices 403 via any type and/or form of gateway or tunneling protocol, e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 434 can include a built-in network adapter, network interface card, PCMCIA network card, EXPRESSCARD network card, card bus network adapter, wireless network adapter, USB network adapter, modem or any other device suitable for interfacing the computing device 403 to any type of network capable of communication and performing the operations described herein.

A computing device 403 of the sort depicted in FIG. 4C can operate under the control of an operating system, which controls scheduling of tasks and access to system resources. The computing device 403 can be running any operating system configured for any type of computing device, including, for example, a desktop operating system, a mobile device operating system, a tablet operating system, or a smartphone operating system.

The computing device 403 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 403 has sufficient processor power and memory capacity to perform the operations described herein. In some embodiments, the computing device 403 can have different processors, operating systems, and input devices consistent with the device.

In embodiments, the status of one or more machines 104, 402 in the network 405 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 403 in response to the CPU 418 executing an arrangement of instructions contained in main memory 420. Such instructions can be read into main memory 420 from another computer-readable medium, such as the storage device 436. Execution of the arrangement of instructions contained in main memory 420 causes the computing device 403 to perform the illustrative processes described herein. One or more processors in a multi-processing arrangement may also be employed to execute the instructions contained in main memory 420. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of a or the server 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
    identifying, by one or more processors via a kernel application executing in a kernel of a server hosting an application, a handshake operation for a communication session between a client device and the server by:
    identifying, by the one or more processors via the kernel application, a session identifier for the communication session established with a Transport Layer Security (TLS) library of the server;
    retrieving, by the one or more processors via the kernel application, the session identifier for the communication session from one or more handshaking messages of the handshake operation for the communication session;
    storing, by the one or more processors via the kernel application, the session identifier in a cache within the kernel;
    retrieving, by the one or more processors via the kernel application, one or more data transfer messages of the communication session between the client device and the application hosted by the server after the communication session has been established;
    correlating, by the one or more processors via the kernel application, the one or more data transfer messages of the communication session based on the one or more data transfer messages containing the session identifier; and generating, by the one or more processors via the kernel application, a record comprising the one or more correlated data transfer messages,
wherein the one or more correlated data transfer messages are used to perform network analytics on a network through which the communication session is performed.

2. The method of claim 1, wherein retrieving the session identifier for the communication session comprises:
retrieving, by the one or more processors via the kernel application, the one or more handshaking messages responsive to an event-based hook detecting the handshake operation for the communication session.

3. The method of claim 2, wherein retrieving the one or more handshaking messages comprises:
retrieving, by the one or more processors via the kernel application, the one or more handshaking messages responsive to the event-based hook detecting the handshake operation for the communication session by monitoring a network stack of the kernel.

4. The method of claim 1, wherein retrieving the session identifier for the communication session comprises:
retrieving, by the one or more processors via the kernel application, the one or more handshaking messages from a location in memory of the kernel.

5. The method of claim 4, wherein retrieving the one or more handshaking messages from the location in memory of the kernel comprises:
retrieving, by the one or more processors via the kernel application, the one or more handshaking messages from the location in memory of the kernel storing a handshaking message generated and transmitted by the server.

6. The method of claim 1, wherein correlating the one or more data transfer messages of the communication session comprises:
correlating, by the one or more processors via the kernel application, one or more plaintext messages of the one or more data transfer messages with endpoint information of the communication session using the session identifier.

7. The method of claim 6, wherein correlating the one or more data transfer messages of the communication session comprises:
correlating, by the one or more processors via the kernel application, the one or more plaintext messages of the one or more data transfer messages with network data packets of the communication session based on the network data packets containing the endpoint information.

8. The method of claim 6, wherein generating the record comprising the one or more correlated data transfer messages comprises:
inserting, by the one or more processors via the kernel application, the one or more plaintext messages and source information or destination information of the communication session in the record.

9. The method of claim 8, wherein generating the record comprises generating a data packet configured for transmission across the communications network.

10. The method of claim 1, further comprising:
transmitting, by the one or more processors via a communication interface, the record comprising the one or more correlated data transfer messages to an analytics server,
wherein the analytics server performs the network analytics on the network based on the one or more correlated data transfer messages in the record.

11. A system comprising:
one or more processors coupled with memory in a server and configured to, via a kernel application executing within a kernel in the memory:
identify a handshake operation for a communication session between a client device and the server by:
identifying, via the kernel application, a session identifier for the communication session established with a Transport Layer Security (TLS) library of the server;
retrieve the session identifier for the communication session from one or more handshaking messages of the handshake operation for the communication session;
store the session identifier in a cache within the kernel;
retrieve one or more data transfer messages of the communication session between the client device and the application hosted by the server after the communication session has been established;
correlate the one or more data transfer messages of the communication session based on the one or more data transfer messages containing the session identifier; and
generate a record comprising the one or more correlated data transfer messages,
wherein the one or more correlated data messages are used to perform network analytics on a network through which the communication session is performed.

12. The system of claim 11, wherein the one or more processors are configured via the kernel application to retrieve the session identifier for the communication session by:
retrieving the one or more handshaking messages responsive to an event-based hook detecting the handshake operation for the communication session.

13. The system of claim 12, wherein the one or more processors are configured via the kernel application to retrieve the one or more handshaking messages by:
retrieving the one or more handshaking messages responsive to the event-based hook detecting the handshake operation for the communication session by monitoring a network stack of the kernel.

14. The system of claim 11, wherein the one or more processors are configured via the kernel application to retrieve the session identifier for the communication session by:
retrieving the one or more handshaking messages from a location in memory of the kernel.

15. The system of claim 14, wherein the one or more processors are configured via the kernel application to retrieve the one or more handshaking messages from the location in memory of the kernel by:
retrieving the one or more handshaking messages from the location in memory of the kernel storing a handshaking message generated and transmitted by the server.

16. The system of claim 11, wherein the one or more processors are configured via the kernel application to correlate the one or more data transfer messages of the communication session by:
correlating one or more plaintext messages of the one or more data transfer messages with endpoint information of the communication session using the session identifier.

17. Non-transitory computer-readable media configured to be stored in executed in a kernel of a memory coupled to one or more processors of a server and comprising instructions that, when executed by the one or more processors, cause the one or more processors to:
  identify a handshake operation for a communication session between a client device and an application hosted by the server by:
identifying a session identifier for the communication session established with a Transport Layer Security (TLS) library of the server;
  retrieve the session identifier for the communication session from one or more handshaking messages of the handshake operation for the communication session;
  store the session identifier in a cache within the kernel;
  retrieve one or more data transfer messages of the communication session between the client device and the application hosted by the server after the communication session has been established;
  correlate the one or more data transfer messages of the communication session based on the one or more data transfer messages containing the session identifier; and
  generate a record comprising the one or more correlated data transfer messages,
  wherein the one or more correlated data messages are used to perform network analytics on a network through which the communication session is performed.

18. The non-transitory computer-readable media of claim 17, wherein executing the instructions causes the one or more processors to retrieve the session identifier for the communication session by:
  retrieving the one or more handshaking messages responsive to an event-based hook detecting the handshake operation for the communication session.

* * * * *